US012635608B2

(12) United States Patent  (10) Patent No.: US 12,635,608 B2

Metayer et al.  (45) Date of Patent: May 26, 2026

(54) CONVEYING SYSTEM FOR A FRUIT HARVESTER

(71) Applicant: CNH Industrial America LLC, New Holland, PA (US)

(72) Inventors: Raphaël Metayer, Coex (FR); David Beleteau, Challans (FR)

(73) Assignee: CNH Industrial America LLC, New Holland, PA (US)

( * ) Notice: Subject to any disclaimer, the term of this patent is extended or adjusted under 35 U.S.C. 154(b) by 809 days.

(21) Appl. No.: 17/638,624

(22) PCT Filed: Aug. 25, 2020

(86) PCT No.: PCT/EP2020/073765

§ 371 (c)(1),
(2) Date: Feb. 25, 2022

(87) PCT Pub. No.: WO2021/037861

PCT Pub. Date: Mar. 4, 2021

(65) Prior Publication Data

US 2022/0295706 A1     Sep. 22, 2022

(30) Foreign Application Priority Data

Aug. 26, 2019    (EP) ..................................... 19315102

(51) Int. Cl.
*A01D 46/28*         (2006.01)
*A01D 46/00*         (2006.01)
*A01D 61/02*         (2006.01)
(52) U.S. Cl.
CPC ............. *A01D 46/00* (2013.01); *A01D 46/28* (2013.01); *A01D 61/02* (2013.01)

(58) Field of Classification Search
CPC ........ A01D 46/00–46/30; A01D 61/00–61/04; A01D 46/28; A01D 61/02; B65G 47/40;
(Continued)

(56) References Cited

U.S. PATENT DOCUMENTS 943,121 A * 12/1909 Merian ................ B65G 17/126
                                                          198/706
3,685,266 A     8/1972 Mohn et al.
(Continued)

FOREIGN PATENT DOCUMENTS

FR          2092954 A6 *  1/1972
FR          2338635 A1     8/1977
(Continued)

OTHER PUBLICATIONS

FR 2590760 A1 translation.*
(Continued)

*Primary Examiner* — Joseph M Rocca
*Assistant Examiner* — Madeline I Runco
(74) *Attorney, Agent, or Firm* — CM Law PLLC; Stephen J. Weed

(57)                    ABSTRACT

A conveying system for a fruit harvester that includes at least one conveyor traveling along a travel path that comprises a first path section which defines a first longitudinal axis and a plurality of buckets connected to the at least one conveyor. The first path section is at least partially twisted such that the at least one conveyor and the plurality of buckets along therewith twist relative to the first longitudinal axis of the first path section.

12 Claims, 3 Drawing Sheets

(58) Field of Classification Search
     CPC ........ B65G 17/26; B65G 17/36; B65G 17/16;
                                             B65G 17/19
     See application file for complete search history.

(56)                    References Cited

U.S. PATENT DOCUMENTS

| | | | | | |
|---|---|---|---|---|---|
| 3,777,463 | A | * | 12/1973 | Claxton ................. | A01D 46/28 |
| | | | | | 56/330 |
| 3,793,814 | A | * | 2/1974 | Rohrbach .............. | A01D 46/28 |
| | | | | | 56/330 |
| 3,901,005 | A | * | 8/1975 | Rohrbach .............. | A01D 46/28 |
| | | | | | 141/324 |
| 4,440,537 | A | * | 4/1984 | Blattermann ........ | B65G 17/126 |
| | | | | | 414/141.4 |
| 10,045,484 | B2 | * | 8/2018 | Williamson ........... | A01D 46/28 |

FOREIGN PATENT DOCUMENTS

| | | | | |
|---|---|---|---|---|
| FR | | 2387585 | A1 | 11/1978 |
| FR | | 2590760 | A1 * | 6/1987 |
| GB | | 2004172 | A | 8/1978 |
| GB | | 2005618 | A | 4/1979 |

OTHER PUBLICATIONS

International Search Report and Written Opinion for PCT Application No. PCT/EP2020/073765 dated Nov. 10, 2020 (11 pages).
Extended European Search Report for EP Application No. 19315102.4 dated Feb. 10, 2020 (5 pages).
Examination Report No. 1 for Australian Pat. App. No. 2020338581, dated May 2, 2025, 4 pages.
Patent Examination Report 1 for New Zealand Pat. App. No. 785198, dated Dec. 2, 2025, 3 pages.

* cited by examiner

CONVEYING SYSTEM FOR A FRUIT HARVESTER

BACKGROUND OF THE INVENTION

The present invention relates to a harvester for harvesting fruit, such as grapes and other berries, and, more specifically to conveying systems used in such harvesters.

A fruit harvester in the form of a self-propelled grape harvester includes a chassis which carries an onboard power plant and several onboard sub-systems for processing the grapes. The grape harvester straddles and traverses along at least one row of grape vines, and a picking system separates the grapes and Material Other than Grapes (referred to as "MOG", such as leaves, stems, wood debris, etc.) from the vines. The picking system typically is in the form of "pivotal shakers" or "trunk shakers". The pivotal shakers can include a double bank of flexible horizontal rods that shake the vine to remove the fruit. The trunk shakers can include parallel skis that move from side to side to impart horizontal vibration to the vines for removal of the grapes and MOG.

A conveying system transports the grapes and MOG to a cleaning system, which in turn separates the grapes from the MOG and cleans the crop. The cleaning system can include one or more cleaning fans, a sorting table, and/or a destemmer. The one or more cleaning fans can be positioned upstream in the cleaning system, and remove larger MOG, such as leaves, from the stream of crop material by suction and discharge the larger MOG, such as behind the harvester. The sorting table can include a combination of conveying rollers and sorting rollers, which can be optimized for different sizes of grapes. The grapes which are dropped on the conveying rollers are transported to the sorting rollers, where the grapes are sorted from the MOG. The sorting rollers can be configured with an adjustable gap between the sorting rollers such that the grapes fall through and the MOG is transported to the end of the sorting table and discharged. The rollers may also receive grapes in bunches and convey these rearwardly to the destemmer. The destemmer removes the central stalk or stems from the grapes, which are received below the destemmer. The picked and cleaned grapes may be stored within onboard storage containers or may be directly transported to a following vehicle with a storage trailer.

A typical conveying system may include buckets attached to an endless chain. The buckets collect the picked fruit underneath the vines, transport the picked fruit upwardly, and deposit the picked fruit onto the cleaning system. For example, GB 2005620 discloses a conveying system that includes a chain with alternating hollow portions and projecting portions attached thereto which together form a series of deformable cups or buckets for collecting and transporting the picked fruit. The bottoms of the cups are attached to the chain in such a manner to allow the sides of the cups to expand away from one another as the chain revolves around a curved portion; thus, depositing the picked fruit onto the cleaning system. Additionally, for example, GB 2004172 discloses another conveying system that includes two endless chains, with buckets respectively attached thereto, that are disposed side by side. The chains have a travel path which causes the chains, and the buckets therewith, to laterally come closer to one another at the bottom of the travel path and further apart from one another at the front, rear, and top of the travel path. Such conveying systems with interlocking buckets desirably gather a greater amount of crop beneath the plant by eliminating gaps in between the buckets. However, the buckets of these conveying systems may undesirably grip the vines of the plant and subsequently break off the vines as the buckets travel rearwardly and upwardly.

What is needed in the art is a cost-effective conveying system that conveys the picked fruit of the plant without damaging the plant.

SUMMARY OF THE INVENTION

The present invention provides a conveying system with at least one conveyor and multiple buckets attached to the conveyor. The conveyor has a travel path which allows the buckets to move laterally outward and subsequently twist, i.e., rotate about a vertical axis, in order to prevent the buckets from damaging or retaining any portion of the plant after the crop material has been picked from the plant.

The invention in one form is directed to a conveying system for a fruit harvester. The conveying system includes at least one conveyor traveling along a travel path that has a first path section which defines a first longitudinal axis, and a plurality of buckets connected to the at least one conveyor. The plurality of buckets is configured for receiving and conveying a picked crop. The first path section is at least partially twisted such that the at least one conveyor and the plurality of buckets along therewith twist relative to the first longitudinal axis of the first path section.

In one exemplary embodiment, the first path section is a back path section in which the plurality of buckets travel upwardly.

In another exemplary embodiment, the travel path further includes a top path section, a bottom path section, a front path section, and the back path section which is downstream of the bottom path section, and the bottom path section defines a second longitudinal axis.

In yet another exemplary embodiment, the first longitudinal axis of the back path section is angled relative to the second longitudinal axis of the bottom path section such that the at least one conveyor is horizontally rotated when traveling from the bottom path section to the back path section and the at least one conveyor is rotated in the back path section as it twists relative to the first longitudinal axis of the first path section.

In yet another exemplary embodiment, the plurality of buckets twist outwardly in the first path section for disengaging with any portion of a plant after receiving the picked crop.

In yet another exemplary embodiment, the fruit harvester has a chassis, and the conveying system further includes at least one track supported by the chassis of the fruit harvester, the at least one track defines the travel path of the at least one conveyor, and the at least one conveyor is received within and moves in response to the at least one track.

In yet another exemplary embodiment, the at least one track has a twisted track portion, and the twisted track portion has a twisted profile which causes the at least one conveyor to twist in relation thereto.

In yet another exemplary embodiment, the twisted track portion of the at least one track defines the back path section of the travel path, and the twisted profile of the twisted track portion extends along the entire back path section.

In yet another exemplary embodiment, the conveying system further includes at least one support member connected to the twisted track portion for supporting the twisted track portion.

In yet another exemplary embodiment, the conveying system further includes at least one tensioner connected to the at least one support member.

In yet another exemplary embodiment, the at least one support member has a top end and a bottom end, and the top end of the at least one support member is connected to the twisted track portion and the bottom end of the at least one support member is connected to the at least one tensioner.

In yet another exemplary embodiment, the conveying system further includes a pair of brackets connecting the top end of the at least one support member to the twisted track portion and a mount for mounting the bottom end of the at least one support member.

In yet another exemplary embodiment, the at least one tensioner is in the form of at least one chain.

In yet another exemplary embodiment, the at least one conveyor is in the form of at least one chain.

In yet another exemplary embodiment, the at least one conveyor is in the form of a pair of conveyors.

An advantage of the present invention is that the conveying system does not damage the plant being harvested by undesirably tearing off portions thereof, which thereby decreases the amount of MOG collected, improves product cleanliness, reduces crop losses, and increases machine reliability by avoiding possible jamming of the fruit harvester.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "forward", "rearward", "left" and "right", when used in connection with the work vehicle and/or components thereof are usually determined with reference to the direction of forward operative travel of the agricultural vehicle, but again, they should not be construed as limiting.

Figure 1:
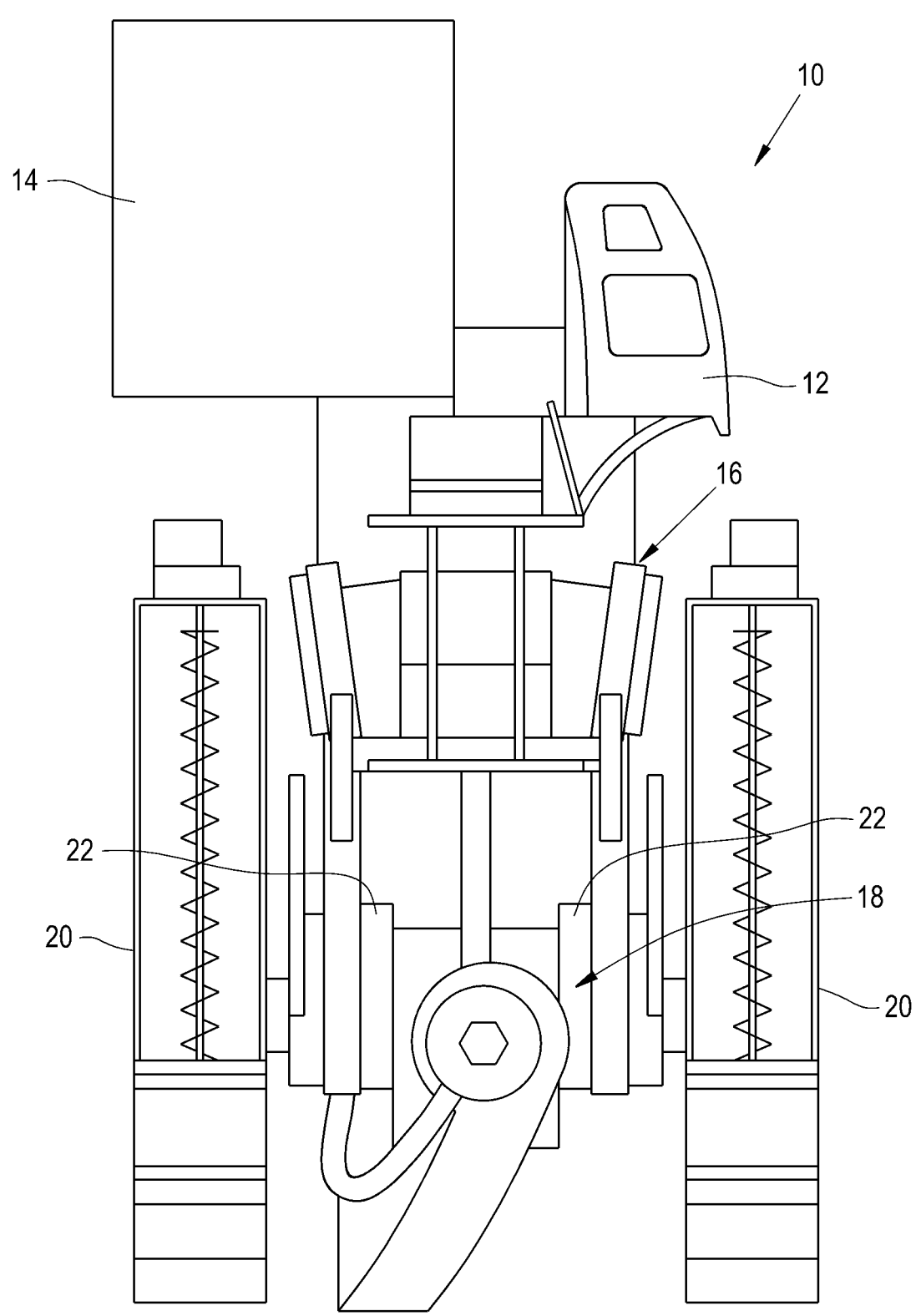
FIG. 1 is a top view of a typical grape harvester.

Referring now to the drawings, and more particularly to FIG. 1, there is shown a known fruit harvester 10 in the form of a grape harvester 10. The fruit harvester 10 can be variously configured for different applications, such as for harvesting olives. The fruit harvester 10 can include a chassis 12, wheels and/or tracks (not shown), a cab 14, and multiple different sub-systems and components, such as a picking system 16 (not shown) with multiple shakers for removing the grapes from the vines, a conveying system 18 for transporting the picked fruit, a cleaning system with multiple conveyors and fans (not shown), and storage containers 20 located at the lateral sides of the fruit harvester 10.

The conveying system 18 includes a pair of juxtaposed conveyors (not shown) and multiple deformable buckets 22 which are respectively connected to the Noria conveyors.

Each conveyor is typically in the form of a chain, traveling within a track, that is driven by a motor. Each conveyor has a respective travel path with a top, bottom, front, and back path section. The travel paths of the conveyors are typically mirrored. As can be appreciated, the buckets 22 collect the picked, i.e. free, crop in the bottom path section, transport the picked crop upwardly toward the cleaning system in the back path section, deposit the picked crop onto the cleaning system in the top path section, and return to their pick-up position in the front path section. The looped travel path of the conveyors causes the conveyors, and the buckets 22 along therewith, to be laterally closer to one another in the bottom path section. In this regard, in the bottom path section, the buckets 22 may mesh or intertwine with one another to reduce any gaps between the buckets 22 and/or squeeze up against the stems of the plants. Given the interlocking relationship between the left and right buckets and the tight tolerance between the buckets 22 and the tracks, as the buckets 22 travel rearwardly and upwardly in the bottom and back path sections, the buckets 22 may undesirably squeeze, grip, pull, break off, tear, or otherwise damage the plants and/or or portions thereof.

Figure 2:
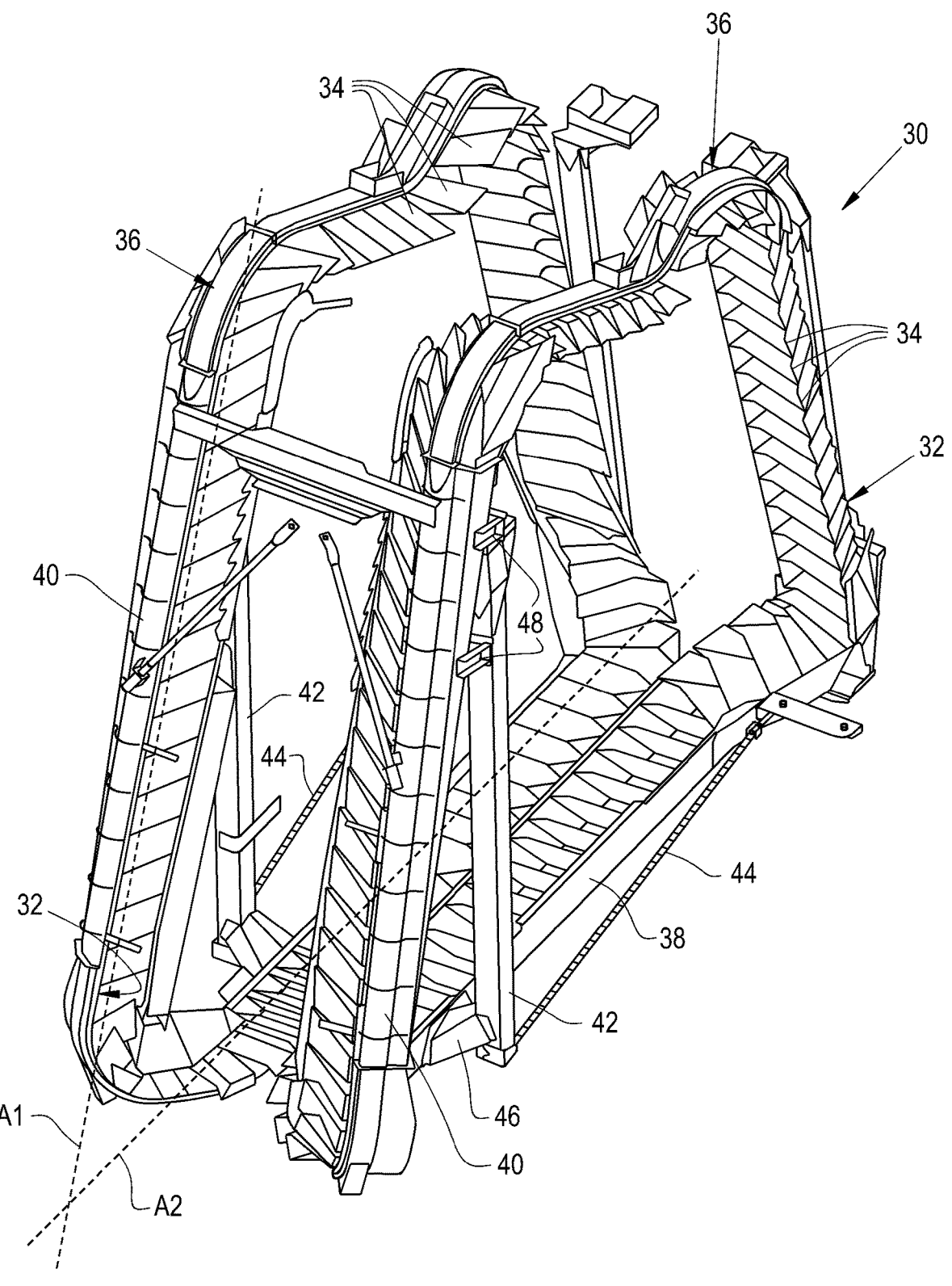
FIG. 2 is a perspective view of a conveying system for a fruit harvester according to an exemplary embodiment of the present invention.
Figure 3:
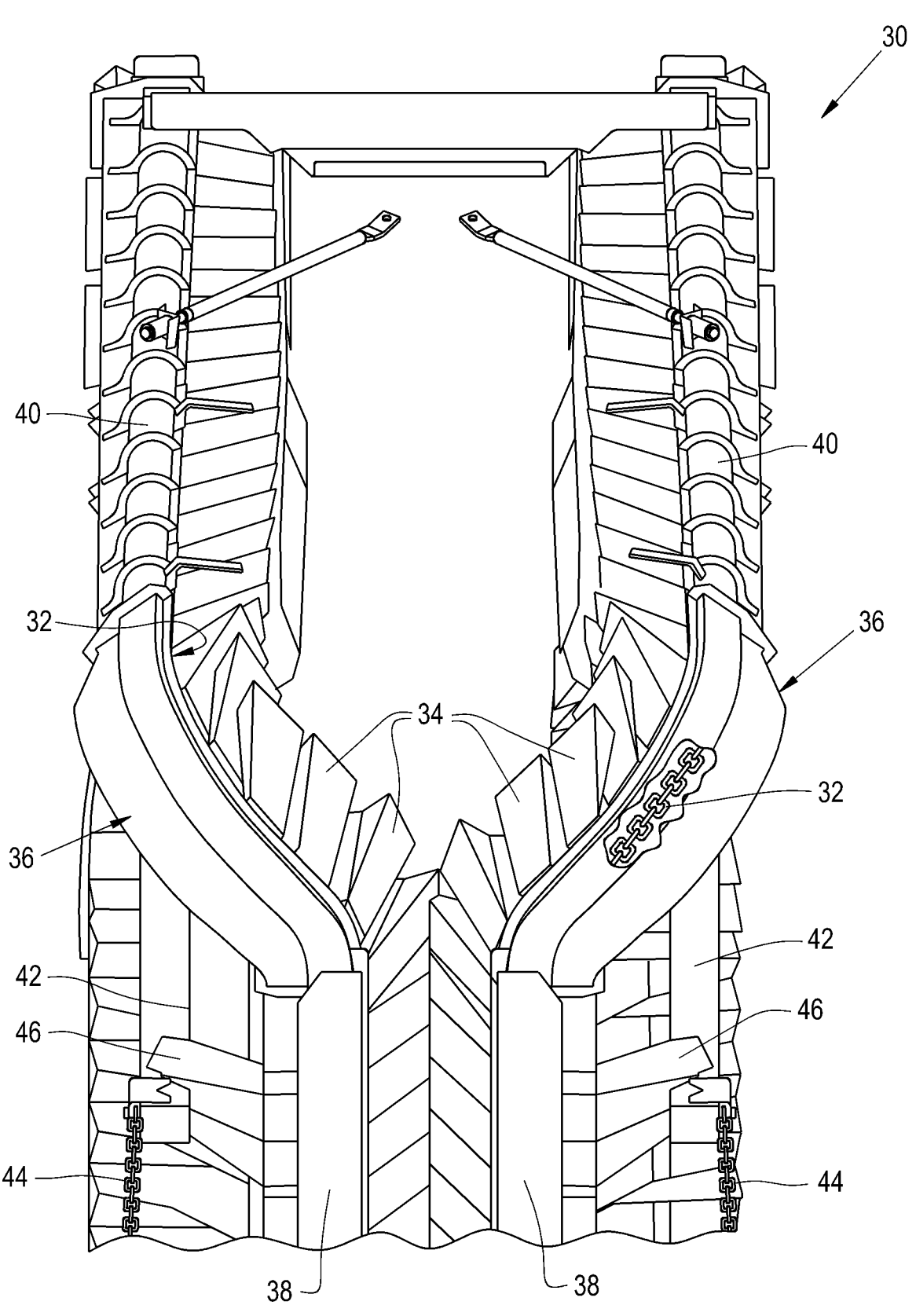
FIG. 3 is a bottom perspective view of the conveying system of FIG. 2.

Referring now to FIGS. 2-3, there is shown a conveying system 30 for a fruit harvester 10 according to an embodiment of the present invention. For example, the conveying system 30 may replace the conveying system 18 of the fruit harvester 10, as described above. However, it should be appreciated that the conveying system 30 may be incorporated into any desired crop harvester. The conveying system 30 generally includes at least one conveyor 32, which travels along a travel path, multiple buckets 34 attached thereto. The conveying system 30 may also include at least one track 36 that defines the geometry of the travel path of a respective conveyor 32. As shown, the conveying system 30 includes left and right tracks 36, conveyors 32 disposed within the tracks 36, and buckets 34 respectively attached to each conveyor 32. As described in more detail below, the travel path of each conveyor 32 widens at the back of the fruit harvester 10 and also provides for the buckets 34 to twist outwardly as they travel upwardly at the back of the fruit harvester 10 in order to prevent the buckets 34 from damaging any portion, e.g. branches, leaves, etc., of the plants being harvested.

Each conveyor 32 is movably connected to and positioned within a respective track 36. Each conveyor 32 may also mount the buckets 34. The conveyors 32 may be in the form of endless chains 32; however, the conveyors 32 may each be in the form of any desired conveyor, such as a belt or cable. The conveyor 32 may comprise any desired material, such as metal. Each conveyor 32 may be rotated by a respective motor or a common motor and shaft (not shown). The conveyors 32 may also be synchronized to one another via a synchronizing member (not shown).

Each bucket 34 may be connected to a respective conveyor 32. For instance, the bases of the buckets 34 may be fastened onto the conveyors 32. Each bucket 34 may be in the form of any desired receiving member. The buckets 34 may be individual members connected adjacent to one another, or the buckets 34 may be formed by a series of recessed and projected portions of a single semi-deformable band. Each bucket 34 may comprise any desired shape and material, such as a semi-deformable plastic material.

As each conveyor 32 moves along its respective travel path, the buckets 34 are correspondingly and sequentially positioned to receive the picked crop at the bottom path section, transport the picked crop upwardly and rearwardly at the back path section, deposit the picked crop onto the cleaning system in a downward-facing position at the top path section, and travel downwardly and forwardly at the front path section to be reset for again receiving the picked crop. Each path section of the travel path may define a respective longitudinal axis. For instance, the back path section may have a longitudinal axis A1 which is approximately perpendicular, plus or minus 30 degrees, to the longitudinal axis A2 of the bottom path section in order to upwardly move the buckets 34 (FIG. 2). In this regard, each conveyor 32 is horizontally rotated when traveling from the bottom path section to the back path section. Furthermore, each conveyor 32 is vertically rotated in the back path section, via a respective track 36, such that each conveyor 32 twists relative to the longitudinal axis A1 of the back path section and allows the buckets 34 to be outwardly twisted for disengaging or releasing any portion of the plant.

The tracks 36 may be connected to and supported by the chassis 12 of the fruit harvester 10. The shape of each track 36 defines a respective travel path for each conveyor 32. In other words, the geometry of each track 36 defines the travel path of each conveyor 32. Hence, the top, bottom, front, and back portions of each track define the top, bottom, front, and back path sections of each travel path, respectively. The tracks 36 may be in the form of segmented track portions or a single, continuous track. As shown, each track 36 is formed by a series of interconnected track portions, including bottom track portion 38 and a twisted track portion 40 located downstream of the bottom track portion 38 and at the back of the fruit harvester 10. As used herein, the term "twisted track portion" may refer to a track portion that has a bend, tilt, or rotation relative to its longitudinal axis. Each twisted track portion 40 has a twisted profile or contour which causes the respective conveyor 32 to twist in relation thereto. The twisted track portion 40 effectively defines the at least partially twisted portion of the back path section. The twisted profile of the twisted track portion 40 may extend along the entire back path section; however, the twisted profile of the twisted track portion 40 may only extend along a portion of back path section. Thus, when transitioning from the bottom track portion 38 to the twisted track portion 40, the conveyors 32 and the buckets 34 therewith are initially deflected outwardly, rotated horizontally, and then twisted horizontally immediately after traveling vertically upward. Each track 36 may be in the form of any desired track, such as a channel and/or tube. Each track 36 may comprise any desired shape and material, such as metal.

Each twisted track portion 40 may be interconnected in between the bottom track portion 38 and the top track portion (unnumbered). Additionally, each twisted track portion 40 may be twisted by and/or held in place by support members 42 and accompanying tensioners 44 attached to and tensioning the support members 42. The bottom end of each support member 42 may be connected to a respective bottom track portion 38, by one or more mounts 46 on one side of the bottom end, and a respective tensioner 44 on the opposite side of the bottom end. The mounts 46 may be semi-deformable mounts 46 which allow the support members 42 to flex, i.e., at least partially move or twist, relative thereto. The top end of each support member 42 may be connected to a respective twisted track portion 40, by one or more brackets 48 and fasteners (FIG. 2). For example, a pair of slotted brackets 48 may connect the top of each support member 42 to the top of each twisted track portion 40. Each support member 42 may be in the form of any desired beam and may comprise any desired material. Each tensioner 44 may be connected in between a bottom corner of a respective support member 42 and a respective bottom track portion 38 and/or chassis 12. The tensioners 44 act to secure the support members 42 so that the entire system is secured in case the fruit harvester 10 is impacted by an object, such as a stone. Each tensioner 44 may be in the form of any desired chain, cable, and/or or biasing member and may comprise any desired material. As shown, the tensioners 44 are in the form of metal chains 44.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A conveying system of a fruit harvester, comprising:
at least one track that defines a travel path;
at least one conveyor that travels along the travel path, wherein the travel path comprises a first path section which defines a first longitudinal axis; and
a plurality of buckets connected to the at least one conveyor, the plurality of buckets receiving and conveying a picked crop; and
wherein the first path section comprises a back path section with reference to forward operative travel having a rotation relative to the first longitudinal axis such that the at least one conveyor and the plurality of buckets along therewith rotates relative to the first longitudinal axis of the first path section;
wherein the at least one track comprises a rotated track portion defining the back path section of the travel path; and
wherein the rotated track portion comprises a rotated profile that extends along an entirety of the back path section, enabling the at least one conveyor to rotate in relation thereto.

2. The conveying system of claim 1, wherein the travel path further comprises:
a top path section,
a bottom path section, and
a front path section;
wherein the back path section is downstream of the bottom path section, and the bottom path section defines a second longitudinal axis.

3. The conveying system of claim 2, wherein the first longitudinal axis of the back path section is angled relative to the second longitudinal axis of the bottom path section such that the at least one conveyor is horizontally rotated when traveling from the bottom path section to the back path section and the at least one conveyor is rotated in the back path section as it rotates relative to the first longitudinal axis of the first path section.

4. The conveying system of claim 1, wherein the plurality of buckets rotate outwardly in the first path section that disengages with any portion of a plant after receiving the picked crop.

5. The conveying system of claim 1, wherein the at least one track is supported by a chassis.

6. The conveying system of claim 1, further comprising at least one support member connected to the rotated track portion for supporting the rotated track portion.

7. The conveying system of claim 6, further comprising at least one tensioner connected to the at least one support member.

8. The conveying system of claim 7, wherein the at least one support member has a top end and a bottom end; and wherein the top end of the at least one support member is connected to the rotated track portion and the bottom end of the at least one support member is connected to the at least one tensioner.

9. The conveying system of claim 8, further comprising a pair of brackets connecting the top end of the at least one support member to the rotated track portion and a mount for mounting the bottom end of the at least one support member.

10. The conveying system of claim 7, wherein the at least one tensioner is in the form of at least one chain.

11. The conveying system of claim 1, wherein the at least one conveyor is in the form of at least one chain.

12. A fruit harvester comprising the conveying system of claim 1.

\*   \*   \*   \*   \*